United States Patent
Barthomeuf et al.

(10) Patent No.: US 9,950,735 B2
(45) Date of Patent: Apr. 24, 2018

(54) USE OF A POWER-STEERING MOTOR TO SIMULATE AN END-OF-TRAVEL STOP FOR SAID STEERING

(71) Applicant: JTEKT EUROPE, Irigny (FR)

(72) Inventors: Julien Barthomeuf, Saint Genis Laval (FR); Pascal Moulaire, La Tour de Salvagny (FR); Pierre-Willem Pilaz, Saint Marcel l'Eclaire (FR)

(73) Assignee: JTEKT EUROPE, Irigny (FR)

( * ) Notice: Subject to any disclaimer, the term of this patent is extended or adjusted under 35 U.S.C. 154(b) by 208 days.

(21) Appl. No.: 14/896,296

(22) PCT Filed: Jun. 3, 2014

(86) PCT No.: PCT/FR2014/051311
§ 371 (c)(1),
(2) Date: Mar. 28, 2016

(87) PCT Pub. No.: WO2014/195625
PCT Pub. Date: Dec. 11, 2014

(65) Prior Publication Data
US 2016/0221601 A1 Aug. 4, 2016

(30) Foreign Application Priority Data
Jun. 4, 2013 (FR) ...................... 13 55131

(51) Int. Cl.
*B62D 5/04* (2006.01)
*B60R 25/02* (2013.01)

(52) U.S. Cl.
CPC ............ *B62D 5/0469* (2013.01); *B60R 25/02* (2013.01)

(58) Field of Classification Search
None
See application file for complete search history.

(56) References Cited

U.S. PATENT DOCUMENTS 6,268,790 B1 * 7/2001 Cregeur ................. B60R 25/02
307/10.2
6,408,235 B1 * 6/2002 Tanke, II ............. B62D 5/0469
701/41
(Continued)

FOREIGN PATENT DOCUMENTS

EP 1167158 A1 1/2002
EP 1234734 A1 8/2002
(Continued)

OTHER PUBLICATIONS

International Search Report dated Mar. 3, 2015 re: Application No. PCT/FR2014/051311; citing: WO 01/20412 A1, EP 1 407 959 A2, WO 03/043869 A1, EP 1 234 734 A1, EP 1 167 158 A1 and US 2001/026613 A1.

*Primary Examiner* — John Olszewski
*Assistant Examiner* — David P. Merlino
(74) *Attorney, Agent, or Firm* — Oliff PLC (57) ABSTRACT

A method for managing a power-steering motor configured to supply a force to assist the movement of a steering rack involves the steering rack being mounted such as to be movable between at least a first position and a second position in order to be able to change the steering angle of a steered wheel. The method includes the steps of defining a virtual end-of-travel threshold strictly between the first position and the second position. If the rack is detected as having crossed the virtual end-of-travel threshold in a predetermined crossing direction, simulating, by the power-steering motor, an end-of-travel stop by including in the assistance instruction a resistance instruction that simulates the effect of a mechanical stop, such as a spring-damper or a mass-spring-damper, preventing the actuator member from progressing further beyond the virtual end-of-travel threshold.

6 Claims, 2 Drawing Sheets

(56) References Cited

U.S. PATENT DOCUMENTS

| | | | |
|---|---|---|---|
| 6,843,341 B2* | 1/2005 | Grebe | B62D 5/065 180/421 |
| 2001/0026613 A1 | 10/2001 | Hackl et al. | |
| 2006/0025911 A1* | 2/2006 | Yao | B62D 5/006 701/41 |
| 2009/0187311 A1* | 7/2009 | Christiansen | B62D 5/0469 701/41 |
| 2012/0205185 A1* | 8/2012 | Champagne | B62D 5/0469 180/446 |
| 2012/0232754 A1* | 9/2012 | Champagne | B62D 5/0469 701/41 |
| 2015/0025742 A1* | 1/2015 | Johnson | B62D 5/0469 701/41 |

FOREIGN PATENT DOCUMENTS

| | | |
|---|---|---|
| EP | 1407959 A2 | 4/2004 |
| WO | 0120412 A1 | 3/2001 |
| WO | 03043869 A1 | 5/2003 |

* cited by examiner

USE OF A POWER-STEERING MOTOR TO SIMULATE AN END-OF-TRAVEL STOP FOR SAID STEERING

TECHNICAL FIELD

The present disclosure relates to the general field of power-steered devices for vehicles, and in particular for motor vehicles.

BACKGROUND

Conventional power-steering devices comprise an actuator member, of steering rack type, which is moveably mounted in translation in a steering housing secured to the chassis of the vehicle, the displacement of said actuator member being controlled by a steering column, which is driven by a steering wheel and which bears a pinion that meshes with the steering rack.

Each of the ends of said actuator member is generally connected, by means of a tie rod, to an effector member, typically formed by a steered wheel carried by a stub axle which can be oriented around its yaw axis.

A power-steering motor, which generally meshes with the steering column or the steering rack, for example by means of a worm gear reducer, completes the device in order to assist, when maneuvering the actuator member, with the manual force exerted by the driver on the wheel.

Although such power-steering devices are generally satisfactory, in particular in that they make driving more pleasant and less tiring, they may however have certain drawbacks.

Indeed, the maximum course of the steering rack is limited, by construction, by mechanical end-of-travel stops. Generally, the abutting occurs as the tie rods comes to bear against the ends of the steering housing per se, or against travel limiters added at the ends of said steering housing.

However, such abutting, during turning, is liable to generate an impact in the steering device, and thus cause the appearance of noise, or even cause the wear of the mechanical members of the steering device.

The disclosure aims consequently at remedying these drawbacks and proposing a new power-steering system which, while enabling a comfortable and intuitive driving experience, protects the steering device from impacts, noise and potential damage related to turning the steering mechanism.

SUMMARY

The disclosure provides means of a method of managing a power-steering motor, during which an assistance setpoint is established which is intended to be applied to a power-steering motor designed for providing an assistance to assist in maneuvering a steering actuator member, of steering rack type, said actuator member being moveably mounted at least between a first position and a second position, distinct from each other, which delimit a functional travel of said actuator member allowing the latter to modify the orientation angle of a steering effector member, of steered wheel type, said method being characterized in that it includes:

a step (a) of defining a virtual end of travel threshold, during which at least one virtual end of travel threshold is chosen which corresponds to a fictional engaging position of the actuator member against a virtual stop, wherein said fictional engaging position strictly lies between the first position and the second position, a step (b) of evaluating a position, during which the instantaneous position of the actuator member is evaluated and compared with the virtual end of travel threshold so as to detect a crossing of said virtual end of travel threshold by said actuator member, and, if is detected that the actuator member has crossed said virtual end of travel threshold in a predetermined crossing direction, a step (c) of simulating an end of travel stop during which is included in the assistance setpoint a resistance setpoint which simulates the effect of a mechanical stop by opposing to the progression, in the considered crossing direction, of the actuator member beyond the virtual end of travel threshold.

Advantageously, the disclosure thus allows using the assistance motor for artificially creating one or several virtual stop(s) which precede the effective material end of travel stops of the mechanical steering members, and more particularly of the actuator member, virtual stops which thus prevent said mechanical members from colliding with said real stops.

In other words, the disclosure allows adding virtual stops to the conventional mechanical stops, and in practice substituting said conventional mechanical stops with virtual stops, which are simulated by a suitable programming of the rules applicable to the power steering motor.

In simulating, by means of the motor, a stop effect, and more particularly a resistance of the steering device against a steering intensification beyond the virtual end of travel threshold, the disclosure advantageously allows to slow down and make the turning movement harder at a distance from the real steering stops, and may in particular prevent the actuator member from reaching its abutted position against said real stops.

In this way, the steering device is freed from a mechanical contact, or at least from a collision, of the mechanical steering members, and more particularly of the actuator member, with the real stops.

In other words, by providing the management and motorized damping of the end of travel of the actuator member, and more globally of the steering device, at a virtual stop, while the actuator member still has a reserve of real travel between the virtual threshold marking said virtual stop and the real limit of travel which is set back, beyond said virtual stop, the mechanical steering members are advantageously protected from impacts, by preventing, or at least by damping, their real abutting.

Furthermore, it is characterized that the use of virtual stops does not disrupt, during normal steering device operation, the feelings and pleasantness of driving, insofar as the disclosure always allows the driver to feel, as he gets close to the effective turning limits of the steering device, a resistant force which faithfully and intuitively simulates an expected entering into abutment behavior.

With regard to this, the use of a virtual stop, the features of which can advantageously be programmed, or even modified, allows even to simulate, at the end of steering, in particular during parking maneuvers, a more gradual (gentler) entering into abutment behavior than the entering into abutment behavior which results from a usual mechanical end of travel blocking.

Hence, the disclosure provides both a greater user comfort and excellent operating safety of the power steering device.

Furthermore, the virtual, programmable nature of the stop provided by the disclosure advantageously allows freely parameterizing, and hence selecting, or modifying if need be, the number and position of the virtual end of travel threshold(s), that is to say the number and position of the virtual stop(s), and or the features (stiffness, damping, etc) of said virtual stops.

Hence, the disclosure offers greater adjusting versatility and adaptation capacity than those of the mechanical travel limiters.

As detailed hereinafter, the use of virtual stops may further contribute in imparting the power steering device with additional functions, for example an antitheft function, a safety function for preventing steering maneuvers at high speed, or a function of adjusting the symmetry of the steering mechanism which controls the running gear carrying the steered wheels.

Finally, it is remarkable that since the implementation of the disclosure involves merely programming the computer that manages the power steering motor, one can consider applying the disclosure, by retrofitting, to most of the power steered devices of vehicles already in circulation.

BRIEF DESCRIPTION OF THE DRAWINGS

Other features and advantages of the disclosure will appear in further detail upon reading the following description, as well as using the accompanying drawings, provided only by way of non limiting and illustrating examples. In the drawings.

DETAILED DESCRIPTION OF THE DRAWINGS

The disclosure relates to a method of managing a power-steering motor 1, during which is elaborated an assistance setpoint Ctot intended to be applied to a power-steering motor 1 designed for supplying an assistance force (Assistance force) for maneuvering a steering 5 actuator member 2 of steering rack type, said actuator member 2 being moveably mounted at least between a first position P1 and a second position P2, which are distinct one from the other, and which delimit a functional travel L0 of said actuator member 2, thus allowing said actuator member to modify the angle of orientation of a steering effector member 3, 4 of steered wheel type.

Figure 2:
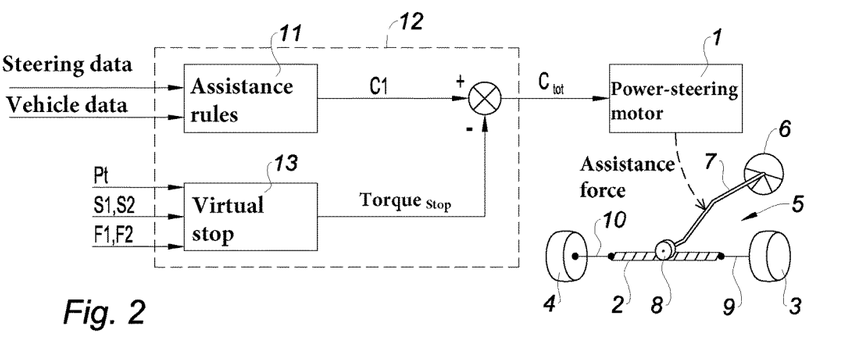
FIG. 2 illustrates, according to a block diagram, the principle for elaborating and applying the assistance setpoint according to the disclosure, comprising elaborating a first assistance setpoint and adding to the latter a possible resistance setpoint which simulates a virtual end of travel stop.

As shown in FIG. 2, the steering device 5 preferably comprises a steering wheel 6 intended for controlling the displacement of the actuator member 2, preferably by means of a steering column 7.

Preferably, the actuator member 2 is formed by a steering rack which is slideably mounted in a steering housing, wherein said steering housing, not shown, is secured to the chassis of the vehicle. A pinion 8 secured to the steering column 7 meshes with said steering rack 2.

The ends of the steering rack 2 are connected to tie rods 9, 10 which transmit, preferably via stub axles, a displacement to the left steered wheel 3 and right 4 steered wheel in order to modify the yaw orientation of said wheels (that is to say, their steer angle).

Figure 1:
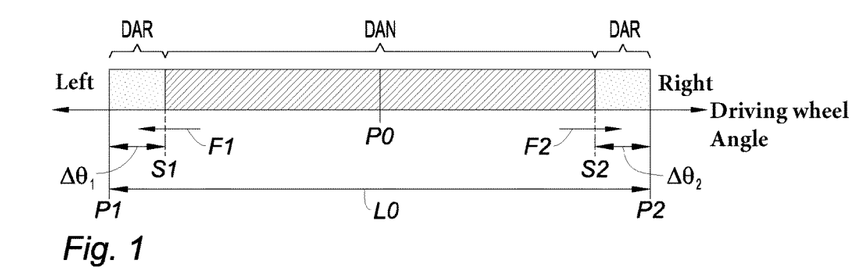
FIG. 1 illustrates, according to a schematic view, the positioning principle of virtual end of travel thresholds which enables limiting the allowed travel of steering members, and more particularly of a steering wheel and steering rack driven by said steering wheel, with respect to the total real mechanical travel of these steering members.

For convenience of description, it will be considered by convention that the first position P1 corresponds to an extreme position of the actuator member 2 in a left maximum turning situation, that is to say, to a left material end of travel limit (beyond which the steering device 5 can no longer, functionally, by construction, turn left any further), while the position P2 corresponds to an extreme position of the actuator member 2 in a right maximum turning situation, that is to say, to a right material end of travel limit (beyond which the steering device 5 can no longer, functionally, by construction, turn right any further).

These first and second positions P1, P2 will preferably correspond to real mechanical abutting positions of the steering device 5, in which the displacement of the actuator member 2 is blocked and cannot turn the effector members 3, 4 any further.

Said first and second positions P1, P2 may more particularly correspond to abutting positions of the ends of the steering rack 2 or the tie rods 9, 10 against the ends of the steering box.

The power-steering motor 1 is arranged to provide an assistance force ("Assistance force"), and more preferably an assistance torque, which here corresponds to the Ctot assistance setpoint and which is applied to the actuator member 2 for assisting the maneuvering of steered wheels 3, 4, according to predetermined assistance rules 11 that are stored within a non volatile memory of an onboard computer 12.

In a manner known per se, such assistance rules 11 allow computing a first assistance setpoint C1 depending on each operating condition of the vehicle, and more particularly, such as is illustrated on FIG. 2, depending on data representing the status of the steering device 5 ("Steering data") on the one hand, among which the torque $\tau_v$ exerted by the driver on the steering wheel 6, and/or the angular position and/or the angular speed of said steering wheel 6, and/or the position or the angular speed of the power-steering motor 1 shaft, and data representing the dynamic behavior of the vehicle ("Vehicle data") on the other hand, such as the longitudinal displacement speed, the yaw rate, lateral acceleration, etc. of said vehicle.

The assistance (torque) force ("Assistance force") is preferably superimposed (algebraically) on the torque exerted by the driver on the steering wheel.

According to a variant, said assistance force can even be used in the place of the torque exerted by the driver on the steering wheel.

Said assistance force may be applied either directly on the actuator member 2, or on the steering column 7, and thus for example by means of a worm gear reducer.

As for the power-steering motor 1, it can be of any suitable type, and in particular hydraulic, or preferably, electric.

According to the disclosure, the method includes a step (a) of defining a virtual end of travel threshold S1, S2 during which at least one virtual end of travel threshold S1, S2 is chosen which corresponds to a fictive engagement position of the actuator member 2 against a virtual stop 13, wherein said fictive engagement position strictly lies between the first position P1 and the second position P2 (i.e. said fictive engagement position is contained within the interval delimited by said positions P1, P2, and is distant from each of said positions P1, P2).

As shown in FIG. 1, two virtual end of travel thresholds are preferably provided, namely a left virtual threshold S1 and a right virtual threshold S2.

Although the location of each of said virtual thresholds S1, S2 is arbitrary and can be freely selected within the open interval ]P1; P2[, said virtual thresholds S1, S2 will preferably each be disposed on either side of the (real) central position P0 of the steering device 5, that is to say, on either side of position P0 of the actuator member 2 in which the steer angle of the steering members 3, 4 is zero (in other words, on either side of the position P0 of the steering rack 2 with respect to the steering housing wherein the steered wheels 3, 4 are straight, that is to say, aligned with the front-rear longitudinal axis of the vehicle).

In such a manner, the left virtual threshold S1 may lie strictly between the central position P0 and the first position P1 corresponding to the real left turning limit, such as to precede said left turning limit P1, in the maneuvering direction of the steering wheel 6 corresponding to increasing the turning movement of the running gear towards the left (that is to say, from the central position P0 towards the extreme left position P1).

Similarly, the right virtual threshold S2 may lie strictly between the central position P0 and the second position P2 corresponding to the real right turning limit, such as to precede said right turning limit P2, in the maneuvering direction of the steering wheel 6 corresponding to increasing the turning movement of the running gear towards the right (that is to say, from the central position P0 towards the extreme right position P2).

In a preferential manner, the left virtual threshold S1 and the right virtual threshold S2 will be disposed symmetrically to each other, with respect to the central position P0.

In practice, the effective travel of the actuator member 2, or in an equivalent manner, the effective travel of the steering wheel 6, extending from the first virtual threshold S1 to the second virtual threshold S2 will hence be shorter than the real functional travel L0.

The method in accordance with the disclosure also includes a step (b) of evaluating a position, during which the instantaneous position Pt of the actuator member 2 is evaluated and compared with the virtual end of travel threshold S1, S2 so as to detect a crossing F1, F2 of said virtual end of travel threshold S1, S2 by said actuator member 2.

It is worth noting, that for the implementation of the disclosure, the first and second positions P1, P2, the instantaneous position Pt of the actuator member 2, as well as the virtual end of travel threshold(s) S1, S2 may be defined indifferently by any parameter representing the position of the actuator member 2 (and, more globally, representing the steering configuration of the steering device 5 and of its steered wheels 3, 4), and in particular, in an equivalent manner, by any measurement or evaluation of the absolute angular position of the steering wheel 6 ("wheel angle"), of the absolute angular position of the steering column 7, or possibly of the absolute angular position of the shaft of the electric power-steering motor (the constant reduction ratio being known).

Thus, particularly, the instantaneous position Pt of the steering rack 2 may be determined from an absolute angular position sensor sensing the absolute angular position of the steering wheel 6, or from a relative position sensor sensing the relative position of the shaft of the power-steering motor 1 wherein said relative position sensor is completed by a calibration algorithm based on the detection of the real abutting positions of the steering rack (that is to say, wherein said algorithm sets a position calibration based on the material limits of the travel).

If during the step b) of evaluating the position, it is detected that the actuator member 2 has crossed the virtual end of travel threshold S1, S2 in a predetermined crossing direction F1, F2, then the method comprises a step c) of simulating an end of travel stop during which it is included within the assistance setpoint Ctot a resistance setpoint $Torque_{stop}$ which simulates the effect of a mechanical stop 13 by opposing to the progression, in the considered crossing direction F1, F2, of the actuator member 2 beyond the virtual end of travel threshold S1, S2.

Advantageously, as mentioned above, the disclosure thus enables using the active driving of the power-steering motor 1 (that is to say supplying said motor 1 in driving power, in particular electric driving power) so as to artificially create one or many virtual stops 13, distinct from the real mechanical stops of the steering device 5, in order to preserve said steering device 5 from the impacts due to abutting situations with mechanical origin.

In other words, the disclosure may offer the mechanical members of the steering device 5 a software (and/or electronic) protection against the harmful effects of a real abutting of said mechanical members, a protection which results in virtually restricting the allowed travel of said mechanical members, and more particularly of the actuator member 2.

Advantageously, as shown in FIG. 1, the setting of virtual end of travel thresholds S1, S2 makes it possible to define, along the functional travel L0 of the actuator member 2 (corresponding to the distance d(P1, P2) which separates the first and second positions P1 and P2), on the one hand at least a normal assistance domain ("DAN"), more restricted than said functional travel L0, and in which only the assistance rules 11, and consequently the first setpoint C1, apply exclusively, and on the other hand, at least a domain (or even preferably two domains, which border the assistance domain on the left-hand side and on the right-hand side of said assistance domain) of reduced assistance ("DAR"), in which the first setpoint C1 is attenuated, or even canceled and replaced, by the resistance setpoint $Torque_{stop}$.

Preferably, the reduced assistance domains DAR may thus act as buffer-areas, between the normal assistance domain DAN and the (extreme) positions P1, P2 of the mechanical end of travel stops of the actuator member 2, so as to slow down or even gently block the progression of the actuator member 2, thanks to the opposition provided by the power-steering motor 1, before said actuator member effectively reaches its mechanical abutting position P1, P2.

Advantageously, the virtual stops, set by the virtual thresholds S1, S2 precede the real stops which materially limit, by construction, the course of the actuator member 2.

Thus, the steering device 5 may be protected by generating in advance, when the actuator member 2 approaches its physical end of travel, a gradual braking of the movement of said actuator member 2, before a real contact occurs, and a fortiori before any impact occurs and/or before any severe constraints (compression, buckling) appear because of the actuator member 2 forcibly coming into abutment against a real stop.

More particularly, the virtual thresholds S1, S2 may be defined in such a manner that the turning movement in the direction of the first extreme position P1, respectively in the direction of the second extreme position P2, is stopped by the virtual stops so that said movement necessarily ends at a distance from the considered extreme position P1, P2.

The virtual stops may thus be used as protective barriers preventing the actuator member 2 from reaching the material travel limits P, P2 thereof.

The distance separating each virtual threshold S1, S2 from the respective nearest extreme position P1, P2 will hence advantageously contribute in defining an available safety margin $\Delta\theta_1$, $\Delta\theta_2$.

Advantageously, the activation of a virtual stop, in particular when nearing the extreme positions P1, P2 further allows returning simultaneously to the driver, through the steering wheel 6 a (tactile) sensation of resistance which is intuitively perceived as a natural abutting.

Driving the vehicle thus equipped with a steering mechanism 5 protected by the use of virtual shock-absorber stops will hence be similar in all points to driving a standard vehicle.

With regard to this, the pleasantness of driving may even be improved, since the virtual stops can be programmed to have a more gradual, less jerky, behavior than the ordinary mechanical stops.

Further, it is worth noting that switching from the normal assistance mode to the reduced assistance mode (or conversely), at the virtual end of travel thresholds S1, S2, activation.e. activating, or conversely de-activating the step c) of stop simulation, depends on the crossing direction F1, F2 of said virtual threshold, a crossing direction which may for example be given by the displacement speed sign $\dot{X}_{Rack}$ of the actuator member 2, when said actuato member reaches said threshold S1, S2.

During step b) of position evaluation according to the method, one may monitor on the one hand the instantaneous position Pt of the assistance member 2 (in order to compare said instantaneous position with the virtual end of travel threshold S1, S2), and more particularly one may deduce therefrom the sign of the position exceedance with respect to the virtual threshold: $X_{Rack}$=Pt−Si with i=1 or 2, and on the other hand the sign of the displacement speed $\dot{X}_{Rack}$ of the actuator member 2, so as to activate the virtual stop 13 when the two signs (the sign of the exceedance and the sign of the speed) are identical, and deactivate said virtual stop 13 when said signs are different.

Thus, when the frontier marked by the virtual end of travel threshold is reached and crossed, thus leaving the normal assistance domain DAN and entering into the reduced assistance domain DAR, i.e. when one further increases (or attempts to further increase) the steering angle beyond the threshold S1, S2 in the direction of the corresponding end of travel limit P1, P2, then the stop simulation is engaged so as to actively oppose to this progression, by means of the motor 1, a resistant force Force$_{stop}$ which is meant to slow down, or even to block the movement of the actuator member 2, and more globally the movement of the steering device 5, or which is even meant to bring said actuator member 2 back towards the virtual end of travel threshold S1, S2, as if the actuator member 2 had in practice encountered a mechanical stop having the features of the virtual stop 13.

Preferably, the resistant force Force$_{stop}$ increases as the amount of exceedance over the threshold S1, S2 increases.

By way of example, with reference to FIG. 1, if the driver turns the steering wheel from right to left, in particular originating from the central position P0, and crosses the left virtual threshold S1 in the right-left crossing direction F1, so that the steering rack 2 comes close to the left end of travel limit P1 thereof, then engaging the virtual stop 13 will cause a resistance force Force$_{stop}$ to appear, and preferably gradually increase, wherein said resistance force is globally oriented from left to right (in the opposite direction to F1), and opposes against further rotating the steering wheel 6 to the left beyond said threshold S1.

The same shall apply, mutatis mutandis, for a right steering maneuver exceeding the right virtual threshold S2 in the left-right crossing direction F2.

Conversely, returning to the normal assistance domain DAN, beneath the virtual end of travel threshold S1, S2, will make the steering device 5 exit from the reduced assistance domain DAR, and will consequently result in deactivating the virtual stop 13, in favor of the normal assistance rules 11 (wherein said assistance rules may notably and preferably be intended for merely amplifying the torque $\theta_v$ exerted by the driver on the steering wheel 6).

Activating the virtual stop 13 may be achieved in algebraically adding a resistance setpoint Torque$_{stop}$ to the first setpoint C1, wherein said resistance setpoint has a sign opposite to the sign of the steering wheel torque $\tau_v$ which tends to increase the steering angle, or even in setting to zero the first setpoint C1, i.e. in removing the normal assistance, and in purely and solely replacing said normal assistance with the resistance setpoint Torque$_{stop}$.

The resistance setpoint Torque$_{stop}$ will preferably be expressed in the form of a torque, said torque being the torque that the power-steering motor 1 must output so as to simulate a resistant force Force$_{stop}$ being applied, wherein said resistance force is equivalent to the force which would be exerted by the virtual stop 13 counter to the actuator member 2, in view of said virtual stop configuration.

Figure 4:
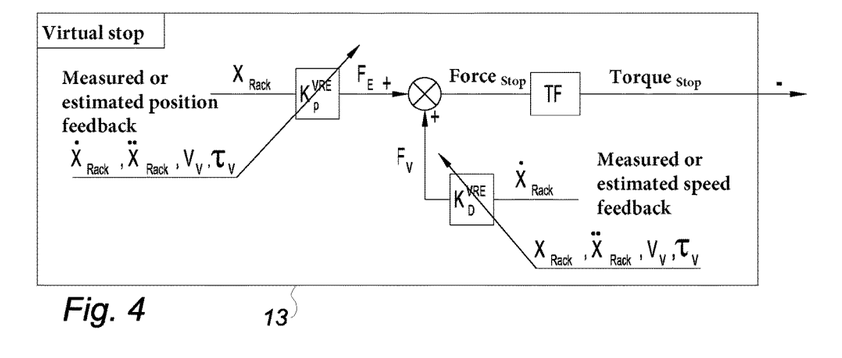
FIG. 4 illustrates, in the form of a block diagram, the implementing of the spring-damper stop of FIG. 3.
Figure 6:
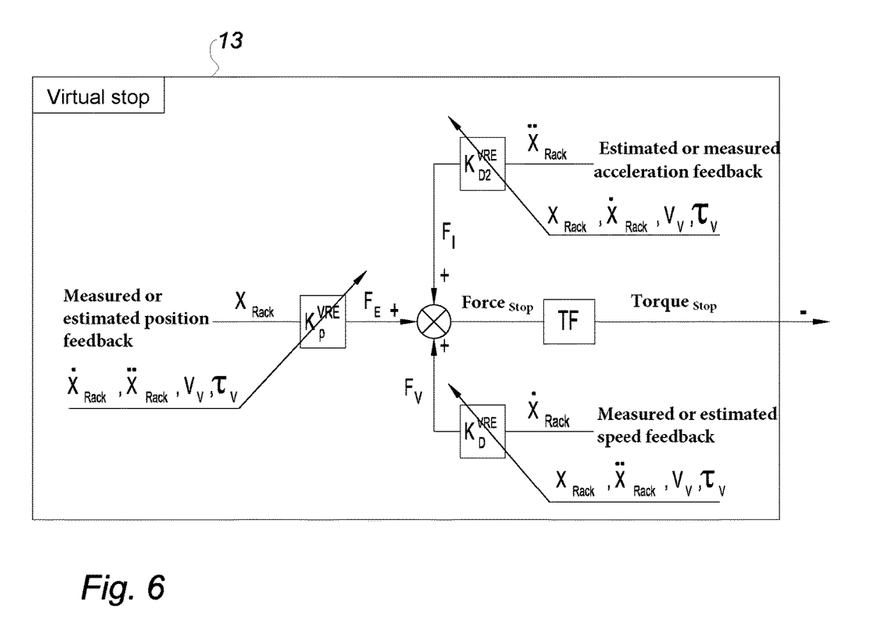
FIG. 6 illustrates, in the form of a block diagram, the implementing of the mass-spring-damper stop of FIG. 5.

In FIGS. 4 and 6, TF designates the transfer function, which is here homogenous with a lever arm, and which enables converting said resistance force Force$_{stop}$ into a torque forming said resistance setpoint Torque$_{stop}$.

If the assistance motor 1 is an electric motor, the resistance setpoint may represent the intensity of the supply current of said motor which will correspond to the required torque.

In any case, as shown in FIGS. 3 to 6, the resistance setpoint Torque$_{stop}$, and more particularly the resultant of the resistant force Force$_{stop}$ corresponding to said resistance setpoint and which is opposed to the displacement of the actuator member 2, preferably comprises at least an elastic component $F_E = F_P^{VRE} \cdot X_{Rack}$ simulating a spring effect, said elastic component $F_E$ being proportional, according to a predetermined stiffness coefficient $K_P^{VRE}$, to the displacement amplitude $X_{Rack}$ of the actuator member 2 beyond the virtual end of travel threshold S1, S2 (that is to say, proportional to the exceedance over said threshold).

This first component, modeled by a first proportional gain (stiffness coefficient) $K_P^{VRE}$, which can be assimilated to the stiffness of a spring and which is applied to the exceedance of position $X_{Rack}$, will produce an elastic return constraint which opposes an increasing resistance as the virtual stop is further pushed in, wherein said resistance is for instance proportional to the steering amplitude which drives the actuator member 2 beyond the considered virtual threshold S1, S2.

For convenience of description, it will here be considered that the exceedance $X_{Rack}$ corresponds to a rectilinear linear displacement in translation of the steering rack 2 in the steering housing, along the longitudinal sliding direction of said steering rack, which is in principle transverse to the front-rear running direction of the vehicle.

As indicated above, the instantaneous position Pt, and hence the displacement amplitude $X_{Rack}$ of the actuator member 2 beyond the virtual end of travel threshold S1, S2, can notably be evaluated from the absolute angular position of the steering wheel 6, being considered that the reduction ratio between the pinion 8 and the steering rack 2 is known, or from the angular position of the shaft of the power-steering motor 1, being considered that the reduction ratio of the worm gear reducer is known, or possibly by any other suitable system or sensor.

Preferably, according to a feature which may be alternative or complementary to the preceding one relating to the presence of an elastic component $F_E$, as shown in FIGS. 3 to 6, the resistance setpoint Torque$_{stop}$, and more particularly the resultant of the resistant force Force$_{stop}$ corresponding to said resistance setpoint and opposed to the displacement of the actuator member 2, comprises at least one viscous component $F_V = K_D^{VRE} \cdot \dot{X}_{Rack}$ simulating a damping effect, said viscous component $F_v$ being proportional, according to a predetermined coefficient of viscosity $K_D^{VRE}$, to the displacement speed $\dot{X}_{Rack}$ of the actuator member.

Here again, for convenience of description, one will take into consideration, for applying the coefficient of viscosity $K_D^{VRE}$ in the form of a second gain, the linear speed $\dot{X}_{Rack}$ corresponding to the translation movement of the steering rack 2 in the steering housing, i.e. the first time derivative of the instantaneous position Pt (or, in an equivalent manner, the first time derivative of the exceedance $X_{Rack}$).

This displacement speed $\dot{X}_{Rack}$ may for example be evaluated from a measurement of the angular speed of the steering wheel 6, the reduction ratio between the pinion 8 and the steering rack 2 being known, or from the angular speed of the shaft of the power-steering motor 1, the reduction ratio of the worm gear steering box being known, or possibly by any other suitable system or sensor.

Figure 5:
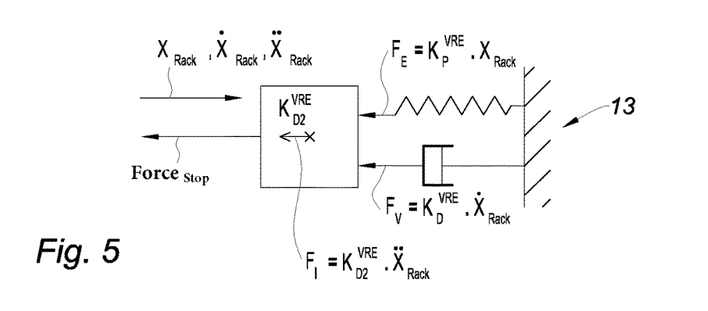
FIG. 5 illustrates a modeling of a virtual mass-spring-damper stop that can be simulated by the power-steering motor.

Preferably, according to a feature which may be alternative or complementary to one and/or the other of the previous features, which relate to the presence of an elastic component $F_E$ and/or a viscous component $F_v$, the resistance setpoint Torque$_{stop}$, and more particularly the result of the resistant force Force$_{stop}$, which corresponds to said resistance setpoint and which is opposed to the displacement of the actuator member 2, comprises at least one inertial component $F_I = K_{D2}^{VRE} \cdot \ddot{X}_{Rack}$, simulating a moveable mass effect, said inertial component $F_I$ being proportional, according to a predetermined coefficient of inertia $K_{D2}^{VRE}$, to the acceleration $\ddot{X}_{Rack}$ of the actuator member 2.

Here again, it will be considered, for the application of this third gain $K_{D2}^{VRE}$ (coefficient of inertia, representing a mass), the linear acceleration $\ddot{X}_{Rack}$, corresponding to the movement in translation of the steering rack 2 in the steering housing, that is to say the second time derivative of the instantaneous position Pt (or, in an equivalent manner, the second time derivative of the exceedance $X_{Rack}$).

Said acceleration $\ddot{X}_{Rack}$ may be evaluated based on computing a derivative of the speed, or successive derivatives of the position of the actuator member 2, or even based on the angular acceleration of the steering wheel 6 or of the shaft of the power-steering motor 1, the possible reduction coefficients being known.

Figure 3:
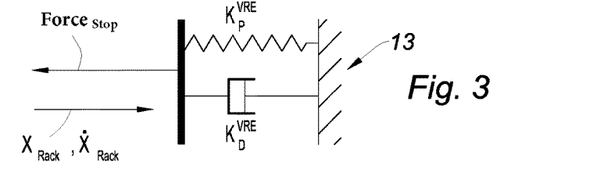
FIG. 3 illustrates a modeling of a virtual spring-damper stop which can be simulated by the power-steering motor.

According to a possible variant, corresponding to FIGS. 3 and 4, the resistance setpoint Torque$_{stop}$, and more particularly the result of the resistant force Force$_{stop}$ which corresponds to said resistance setpoint and which is opposed to the displacement of the actuator member 2, is obtained by an expression of the first order simulating a spring-damper stop 13 and comprising to this end an elastic component $F_E$ and a viscous component $F_v$.

More particularly, in reference to FIG. 4, said expression will be written (s being the variable used by Laplace transform):

$$Torque_{Stop} = -TF * K_P^{VRE} * X_{Rack} * \left( \frac{K_D^{VRE}}{K_P^{VRE}} \cdot s + 1 \right)$$

Possibly, the behavior, in particular the dynamic behavior, of the stop 13 may thus be exclusively modeled with these two elastic and viscous components, corresponding to a virtual stop mechanism comprising a spring of stiffness $K_P^{VRE}$ mounted in parallel with a linear damper of viscosity $K_D^{VRE}$, said two components thus defining a system of the first order with respect to the threshold exceedance position $X_{Rack}$ of the actuator member 2.

Advantageously, the properties of such a virtual spring-damper stop may be chosen or modified by appropriately selecting coefficients of stiffness $K_P^{VRE}$ and viscosity $K_D^{VRE}$ (which is equivalent to adapting the impedance of the virtual stop), particularly by using the following formulas:

$$\tau_{Stop} \approx \frac{K_D^{VRE}}{K_P^{VRE}} \quad \text{the constant of time of the virtual spring-damper stop,}$$

$$\omega_{Stop} = 1/\tau_{Stop} = \frac{K_P^{VRE}}{K_D^{VRE}} \quad \text{the proper mode of said spring-damper stop, and}$$

$$F_{Stop} = \frac{\omega_{Stop}}{2 * \pi} \quad \text{the proper frequency of said virtual spring-damper stop.}$$

According to another possible variant, corresponding to FIGS. 5 and 6, the resistance setpoint Torque$_{stop}$, and more particularly the resultant of the resistant force Force$_{stop}$ corresponding to said resistance setpoint and which is opposed to the displacement of the actuator member 2, is obtained by an expression of the second order simulating a mass-spring-damper stop 13 and comprising to this end an elastic component $F_E$, a viscous component $F_v$, and an inertial component $F_I$.

More particularly, with reference to FIG. 6, said expression will be written:

$$Torque_{Stop} = -TF * K_P^{VRE} * X_{Rack} * \left( \frac{K_{D2}^{VRE}}{K_P^{VRE}} \cdot s^2 + \frac{K_D^{VRE}}{K_P^{VRE}} \cdot s + 1 \right)$$

Advantageously, such a model of the second order, which involves the first and second derivatives of the threshold exceedance position $X_{Rack}$ of the actuator member 2, is more complete than the previous one, of the first order, and makes it possible to obtain a more accurate rendering of the entering into virtual abutment, ensuring a better driving feel, more natural and more intuitive for the driver.

Furthermore, one may easily adjust the dynamic behavior of such a virtual stop, and in particular the bounce effect, more or less damped, that said virtual stop provides to the steering device 5.

One may indeed advantageously select or modify the properties of such a virtual mass-spring-damper stop 13, wherein the simulated mechanism differs from the simulated mechanism shown in FIG. 3 by an additional inertial mass $K_{D2}^{VRE}$ which is carried by the spring-damping mechanism, in operating an appropriate selection of the coefficients of stiffness $K_P^{VRE}$, of viscosity $K_D^{VRE}$ and of inertia $K_{D2}^{VRE}$, and more particularly in using the following approximate formulas:

$$\omega_{Stop} \approx \sqrt{\frac{K_{D2}^{VRE}}{K_P^{VRE}}} \quad \text{the proper mode of the virtual mass-spring-damper stop,}$$

$$F_{Stop} = \frac{\omega_{Stop}}{2*\pi} \quad \text{the proper frequency of said virtual mass-spring-damper stop, and}$$

$$\xi_{Stop} \approx \frac{K_D^{VRE}}{2} \cdot \sqrt{\frac{K_{D2}^{VRE}}{K_P^{VRE}}} \quad \text{the reduced damping}$$

According to a possible variant, the values of the virtual end of travel threshold(s) S1, S2, may be set such as to remain constant, whatever the operating conditions of the vehicle.

However, according to a variant, the virtual end of travel threshold(s) and/or, preferentially, the coefficients of stiffness $K_P^{VRE}$, of viscosity $K_D^{VRE}$ and of inertia $K_{D2}^{VRE}$, will be modified according to at least one parameter from among: the speed of displacement $V_v$ of the vehicle on which the power-steering motor 1 is set, the torque $\tau_v$ exerted by the driver on a steering wheel 6 which controls the displacement of the actuator member 2, the position (instantaneous Pt, respectively in exceedance $X_{Rack}$), the speed $\dot{X}_{Rack}$ or the acceleration $\ddot{X}_{Rack}$ of the actuator member 2.

In other words, it will be possible to adapt, according to the operating conditions of the vehicle, the strategy of implementing virtual stops 13, and in particular the activating conditions of said virtual stops 13 and/or the impedance of said virtual stops 13, upon which will depend in particular the amplitude of the action of said virtual stops (the intensity of the resistant force provided by said stops).

To this end, one may advantageously store maps (or "gain tables") in a non volatile memory of the computer 12 for setting the threshold values S1, S2 or coefficients of stiffness, viscosity or inertia, depending on the considered parameter(s).

By way of example, one may, when the vehicle is circulating at high speed, beyond a predetermined speed threshold, on the one hand bring the virtual thresholds S1 and S2 closer to the central position P0, such as to extend the reduced assistance domain DAR, and on the other hand "spread" the action of the virtual stop 13 so as to have said virtual stop take action in a very gradual manner on these reduced assistance domains, for example by increasing the damping of said stop, and thereby avoiding or curbing the strong steering wheel movements liable to cause the vehicle to swerve.

On the contrary, at low speed (below a predetermined low speed threshold), and in order to facilitate the parking access movements or clearing movements, one may opt for virtual thresholds S1, S2 which are more distant from the central position P0, so as to shorten the reduced assistance domains DAR in favor of a widening of the normal assistance domain DAN (which makes it possible to benefit from the widest possible steering amplitude available during the maneuver), and opt for a harder and/or less damped stop 13.

According to another possibility, which may constitute an disclosure in its own right, the virtual end of travel stops S1 S2, and consequently the extent of the normal assistance domain DAN available for maneuvering the actuator member 2, may be modified according to the dimension, and in particular according to the width, of the tires in use.

More particularly, the virtual thresholds S1, S2 may be brought closer to the central position P0 when the width of the tires increases, so that the virtual abutting occurs before the tire wall comes into contact with the vehicle body or a member of the steering device 5, and thus prevents the tire wall from coming into contact with said vehicle body or said member of the steering device 5.

According to a possible variant, provided by way of indication and applicable to the different situations considered above, the displacement of the actuator member 2 is controlled by a steering wheel 6, and the virtual end of travel threshold S1, S2 precedes by 30 degrees to 60 degrees, and preferably by around 50 degrees, the extreme steering angular position of said steering wheel 6 which corresponds to the mechanical displacement limit, here P1, P2, of the actuator member 2 in the considered steering direction.

In other words, such as is illustrated on FIG. 1, the virtual stop 13 simulation is preferably designed to be activated from a trigger threshold which precedes the real stop P1, P2 of a safety margin $\Delta\theta_1$, $\Delta\theta_2$ ranging between 30 degrees and 60 degrees (in the considered crossing direction F1, F2). By way of indication (or alternatively), this safety margin $\Delta\theta_1$, $\Delta\theta_2$ may represent from 10% to 20% of the total angular travel of the steering wheel 6, wherein said total angular travel also corresponds to the real functional travel L0 of the actuator member 2.

By artificially making the movement of the actuator member 2 harder, and/or, in an equivalent manner, by making the rotation of the steering wheel 6 harder, upstream of the first and second real abutting positions P1, P2 of the actuator member 2, but only from the virtual stops S1, S2 relatively close to these positions, the steering may be effectively protected from impacts, without however hindering driving.

Furthermore, according to a possible implementing variant which may constitute an disclosure in its own right, the method may be used as an anti-theft method, by parameterizing the virtual end of travel threshold(s) S1, S2 such as to use the power-steering motor 1 to lock the displacement of the steering actuator member 2 in an invariable position, or restrict said displacement within a predetermined restraining range, which is smaller than 50%, 30% or even 10% of the displacement range corresponding to the normal functional travel L0 of said actuator member.

In other words, according to an application which constitutes an disclosure in its own right, the power-steering motor 1 may be used as an active anti-theft device, in providing said motor 1 with a resistance setpoint such that said resistance setpoint immobilizes or restrains the steering device 5 in an restraining range which is too small to allow steering changes required for driving the vehicle.

To this end, the two virtual left and right thresholds S1, S2 may advantageously be brought closer to each other, in the vicinity (on either side) of the instantaneous position Pt that the actuator member (respectively the steering wheel 6) occupied (whatever said instantaneous position is) when the vehicle was previously stopped and locked, or these two left S1 and right S2 thresholds could even be made coincident with said position Pt.

Thus, a virtual two-directional locking stop 13 is obtained, that is to say, a locking stop which opposes both turning to the left F1 and turning to the right F2 from the instantaneous position Pt occupied by the steering device 5 which is thus locked.

Of course, the "anti-theft" adjustment of the stop 13 will preferably correspond to high values of the coefficient of stiffness $K_P^{VRE}$, of viscosity $K_D^{VRE}$ and/or of inertia $K_{D2}^{VRE}$, strictly higher than the values used for the virtual stops which are implemented during normal driving (when the steering is unlocked, the anti-theft device being deactivated).

Thus, particularly hard virtual anti-theft stops 13 will be opposed to any non allowed maneuver of the steering device 5, and thus even though no physical mechanical obstacle is present for hindering said steering device 5.

According to a possible variant of implementation, which may constitute an individual application or be complementary to any one of the uses described in the above, the method may be used as a method of adjusting the symmetry of a running gear of the vehicle including at least one effector member 3, 4 formed by a steered wheel.

In such a case, during said method it is set a first virtual end of travel threshold S1 and a second virtual end of travel threshold S2 such that the first virtual end of travel threshold S1 and the second virtual end of travel threshold S2 are located at equidistance on either side of a central median position P0 which corresponds to an absence of turning of the steered wheel(s) 3, 4 of the running gear.

Advantageously, based on the hypothesis that the steering mechanism 5 is materially imperfect, such that the left steering limit P1 is not the exact symmetry of the right steering limit P2 about the central position P0 in which the wheels 3, 4 are straight, i.e. the steering mechanism 5 is practically such that the available travel d(P0, P1) for turning on the left differs from the available travel d(P0, P2) for turning on the right, the method will indeed allow, to artificially restore, virtually, the symmetry of the running gear, and more particularly the symmetry of the steering control, by placing the virtual end of travel thresholds S1, S2 in a manner which is exactly symmetrical on the left and on the right of the central position P0, wherein said central position will in fact coincide with the median position of the travel d(S1, S2) which remains available between said virtual stops (that is to say, said central position P0 will coincide with the middle of the normal assistance domain DAN), such that the resulting available travels are equal on the left side and on the right side of said central position P0: d(P0, S1)=d(P0, S2)=1/2 d(S1, S2).

A virtual management algorithm may thus compensate for the material tolerances which cause a mechanical excentration of the steering 5.

Of course, the disclosure also relates to as such, a computer program containing code elements enabling implementing a method in accordance with the disclosure when said program is read by a computer 12, as well as a data medium containing such a computer program.

The disclosure also relates to a power-steering module comprising a computer 12 (such as an onboard computer, automaton, etc) programmed to implement such a method, as well as a vehicle, and in particular a land vehicle with driving wheels and steered wheels equipped with such a power-steering module.

Obviously, the disclosure is in no way limited to the sole described variants, the ones skilled in the art being in particular able to isolate or freely combine any one of the aforementioned features, or to substitute equivalents.

SUMMARY $X_{Rack}$=Pt−Si measured or estimated exceedance position (displacement amplitude with respect to the considered threshold Si, with i=1 or 2) of the steering rack 2 (actuator member).

$\dot{X}_{Rack}$=measured or estimated speed of the steering rack 2 (actuator member).

$\ddot{X}^{Rack}$=estimated acceleration of the steering rack 2 (actuator member).

$V_v$=displacement speed of the vehicle.

$\tau_v$=torque exerted by the driver on the steering wheel 6.

Torque$_{stop}$=computed resistance setpoint, corresponding to the resistant torque which should be exerted by the power-steering motor 1 to simulate the resistance force effect of the virtual stop 13.

Force$_{stop}$=computed resistance force, corresponding to the effect of resistance to the displacement provided by the virtual stop 13.

TF=transfer function (reduction ratio homogenous with a lever arm) allowing to convert the computed resistance force into corresponding resistance torque (resistance setpoint).

$K_P^{VRE}$=coefficient of stiffness (spring) of the virtual stop 13.

$K_D^{VRE}$=coefficient of viscosity (damper) of the virtual stop 13.

$K_{D2}^{VRE}$=coefficient of inertia (mass) of the virtual stop 13.

s=variable (complex) used for Laplace transforms.

The invention claimed is:

1. A method of managing a power-steering motor, during which an assistance setpoint (Ctot) is established for a power-steering motor for providing an assistance force (Assistance force) to assist in maneuvering a steering actuator member, of steering rack type, said actuator member being moveably mounted at least between a first position and a second position, distinct from each other, which delimit a functional travel of said actuator member such that the actuator member can modify an orientation angle of a steering effector member, of steered wheel type, the method includes the following steps:

a step (a) of defining a virtual end of travel threshold, during which at least one virtual end of travel threshold is chosen which corresponds to a fictional engaging position of the actuator member against a virtual stop, wherein said fictional engaging position strictly lies between the first position and the second position, a step (b) of evaluating a position, during which an instantaneous position of the actuator member is evaluated and compared with the virtual end of travel threshold so as to detect a crossing of said virtual end of travel threshold by said actuator member, and, when it is detected that the actuator member has crossed said virtual end of travel threshold in a predetermined crossing direction, a step (c) of simulating an end of travel stop during which is included in the assistance setpoint (Ctot) a resistance setpoint (Torque$_{stop}$) which simulates the effect of a mechanical stop by opposing to the progression, in a considered crossing direction of the actuator member beyond the virtual end of travel threshold, wherein the resistance setpoint (Torque$_{stop}$) is obtained by an expression of the first order simulating a spring-damper stop and which comprises to this end an elastic component ($F_E=K_P^{VRE} \cdot X_{Rack}$) simulating a spring effect, which is proportional, according to a predetermined stiffness coefficient ($K_P^{VRE}$), to a displacement amplitude ($X_{Rack}$) of the actuator member beyond the virtual end of travel threshold and a viscous component ($F_V = K_D^{VRE} \cdot \dot{X}_{Rack}$), simulating a damping force, which is proportional, according to a predetermined coefficient of viscosity ($K_D^{VRE}$), to a displacement speed ($\dot{X}_{Rack}$) of the actuator member, or by an expression of the second order simulating a mass-spring-damper stop and which comprises to this end an elastic component ($F_E$), a viscous component ($F_v$), and an inertial component ($F_1 = K_{D2}^{VRE} \cdot \ddot{X}_{Rack}$), simulating a moveable mass effect, which is proportional, according to a predetermined coefficient of inertia ($K_{D2}^{VRE}$), to an acceleration ($\ddot{X}_{Rack}$), of the actuator member, and wherein the virtual end of travel threshold and/or the coefficients of stiffness ($K_P^{VRE}$), of viscosity ($K_D^{VRE}$), and of inertia ($K_{D2}^{VRE}$), are modified according to at least one parameter selected from the group consisting of a speed of displacement ($V_v$) of a vehicle on which the power-steering motor is set, a torque ($\tau_v$) exerted by a driver on a steering wheel which controls a displacement of the actuator member, the position (Pt, $X_{rack}$) of the actuator member, the speed ($\dot{X}_{Rack}$) of the actuator member, and the acceleration ($\ddot{X}_{Rack}$) of the actuator member.

2. The method according to claim 1, wherein when a speed of the vehicle exceeds a predetermined high speed threshold, a damping of the virtual stop is increased.

3. The method according to claim 1, wherein the displacement of the actuator member being controlled by a steering wheel, the virtual end of travel threshold precedes by 30 degrees to 60 degrees, an extreme steering angular position of said steering wheel which corresponds to a mechanical displacement limit of the actuator member in a considered steering direction.

4. The method according to claim 1, further comprising parameterizing the virtual end of travel threshold to use the power-steering motor to lock a the displacement of the steering actuator member in an invariable position, or restrict said displacement within a predetermined restraining range, less than 50%, the displacement range corresponding to the normal functional travel of said actuator member.

5. The method according to claim 4, wherein an adjustment of the virtual stop corresponds to values of the coefficients of stiffness ($K_P^{VRE}$), of viscosity ($K_D^{VRE}$) and/or of inertia ($K_{D2}^{VRE}$), strictly higher than those used for the virtual stops implemented during normal driving.

6. The method according to claim 1, further comprising adjusting a symmetry of a running gear of a vehicle including at least one effector member formed by a steered wheel, during which is set a first left virtual end of travel threshold and a second right virtual end of travel threshold such that the first virtual end of travel threshold and the second virtual end of travel threshold are located at equidistance on either side of a central median position which corresponds to an absence of turning of steered wheel(s) of the running gear.

* * * * *